United States Patent [19]
Fischer

[11] Patent Number: 5,913,792
[45] Date of Patent: Jun. 22, 1999

[54] DEVICE FOR INSTALLING IMPACT-TYPE ANCHORING MEANS

[75] Inventor: Rainer Fischer, Waldachtal-Hörschweiler, Germany

[73] Assignee: Fischerwerke, Artur Fischer, Waldachtal, Germany

[21] Appl. No.: 08/739,168

[22] Filed: Oct. 30, 1996

[30] Foreign Application Priority Data

Nov. 15, 1995 [DE] Germany ............... 295 18 109 U

[51] Int. Cl.⁶ .................................................. E04C 5/12
[52] U.S. Cl. ........................... 52/698; 52/125.5; 52/704; 52/705; 52/711; 411/60; 411/395
[58] Field of Search ............... 52/125.1, 125.4, 52/125.5, 698, 704, 705, 711; 411/41, 44, 45, 48, 55, 60, 63, 395, 397, 480, 500

[56] References Cited

U.S. PATENT DOCUMENTS

| | | | |
|---|---|---|---|
| 827,230 | 7/1906 | Goeppinger | 411/395 X |
| 2,088,358 | 7/1937 | Adams | 411/44 |
| 2,892,376 | 6/1959 | Schonfeld | 411/63 |
| 3,461,769 | 8/1969 | Brosseit | 411/395 X |
| 3,472,301 | 10/1969 | Pearce, Jr. | 52/704 X |
| 3,803,791 | 4/1974 | Turnbull et al. | 52/698 X |
| 4,653,132 | 3/1987 | Yamada | 411/60 X |
| 4,685,847 | 8/1987 | Kessler | 52/698 X |

FOREIGN PATENT DOCUMENTS

| | | | |
|---|---|---|---|
| 0 056 854 | 10/1985 | European Pat. Off. . | |
| 0396805 | 11/1990 | European Pat. Off. | 411/44 |

*Primary Examiner*—Carl D. Friedman
*Assistant Examiner*—Timothy B. Kang
*Attorney, Agent, or Firm*—Michael J. Striker

[57] ABSTRACT

A device for installing an impact-type anchoring unit having an expansion sleeve with an internal bore tapering in a forward region and threaded in a rearward region and an expansion body adapted to be driven into the expansion sleeve by an impact tool having a rod, the device comprising a body part having a stop flange adapted to abut against an object in which the impact-type anchoring unit is to be installed, the body part also having a threaded portion located adjacent to the stop flange and screwable in the threaded rearward portion of the internal bore of the sleeve, the body part also having a through going internal bore with a diameter adapted to be larger than the rod of the impact tool.

4 Claims, 1 Drawing Sheet

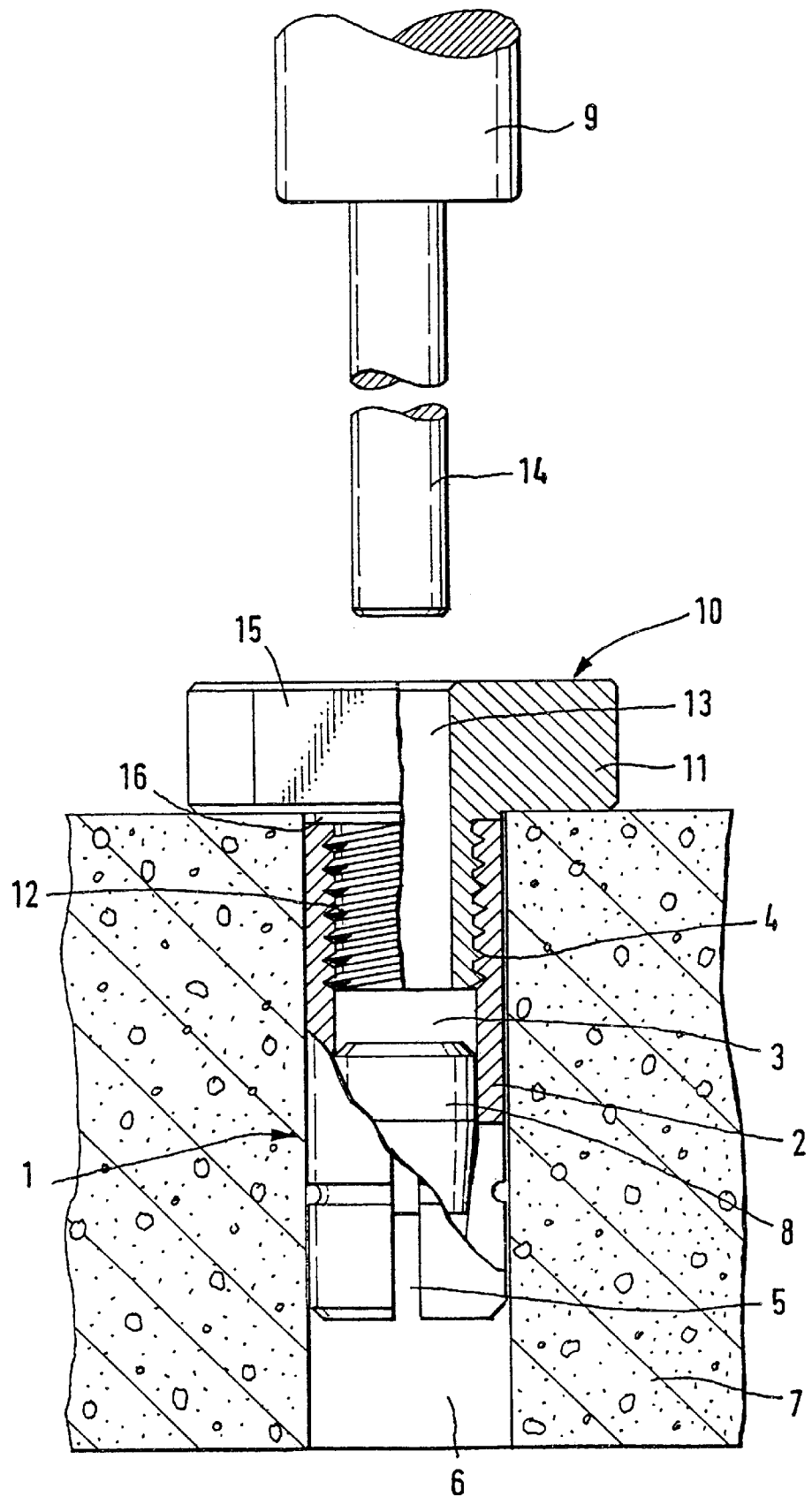

5,913,792

DEVICE FOR INSTALLING IMPACT-TYPE ANCHORING MEANS

BACKGROUND OF THE INVENTION

The present invention relates to a device for installing impact-type anchoring means.

More particularly, it relates to a device for installing an impact-type anchoring means formed by a partially slotted sleeve with an internal bore tapering toward a forward end and having a screw thread, and an expansion body driven in the sleeve by an impact tool for anchoring.

Impact-type anchoring means of the above mentioned type are disclosed for example in the European patent document EP-PS 0 056 854. To anchor the anchoring means, the expansion body is driven into the tapering internal bore of the sleeve of the impact-type anchoring means. Because of friction, it is possible to drive the expansion body into the internal bore only if the sleeve is supported against the drilled hole. Supporting is effected either by the sleeve fitting against the bottom of the drilled hole, or by means of a flange integrally molded on the sleeve, which flange sits on the outside of the object to be secured. Supporting on the bottom of the drilled hole is not possible, however, if the impact-type anchoring means is to be anchored in a plate-like fixing site with a through bore to receive the impact-type anchoring means.

SUMMARY OF THE INVENTION

Accordingly it is an object of the present invention to provide a device for installing an impact-type anchoring means which avoids the disadvantages of the prior art.

In keeping with these objects and with others which will become apparent hereinafter, one feature of the present invention resides, briefly stated in a device for installing an impact-type anchoring means of the above mentioned type, wherein the device has a stop flange and a threaded portion adjacent to the stop flange and arranged to be screwed into the internal screw thread of the sleeve of the impact-type anchoring means and the device is provided with a through internal bore with a diameter larger than the rod of the impact tool.

When the device is designed in accordance with the present invention, the impact-type anchoring means can be placed and anchored without special measures for supporting the sleeve of the impact-type anchoring means against the drilled hole.

The inventive device is screwed, with its cylindrical portion having an external screw thread, into he internal screw thread of the sleeve of the impact-type anchoring means until the stop flange of the device meets the rear end face of the expansion anchoring means. With the device screwed in, the impact-type anchoring means is now inserted into the prepared drilled hole of the fixing site until the stop flange sits on the outer surface of the fixing site. Through the internal bore of the device is pushed the rod of an impact tool and by means of hammer blows the expansion body is driven into the tapering internal bore of the sleeve of the impact-type anchoring means until the impact-type anchoring means is properly anchored in the hole drilled in the fixing site. The stop flange of the device thereby prevents the impact-type anchoring means from slipping deeper, so that it can be anchored even in the case of through drilled holes in the fixing site. After anchoring, the device is screwed out of the sleeve of the impact-type anchoring means again, so that the internal screw thread can be used for detachable fixing of an object by means of a screw. Since the impact-type anchoring means requires no special measures for supporting it in the drilled hole, it can also be anchored in a customary manner by sitting on the bottom of the drilled hole.

Because of over-tightening of the device against the outer surface of the fixing site which may occur under certain circumstances when the expansion body is driven in, unscrewing of the device from the sleeve may be rendered difficult. It is therefore of advantage to provide, on the stop flange of the device, engagement means for a rotary tool.

In a further embodiment of the invention there can be arranged between the stop flange and the thread portion a cylindrical collar, the diameter of which corresponds approximately to the diameter of the impact-type anchoring means. With this collar it is possible to set the impact-type anchoring means somewhat deeper in the drilled hole, so that after anchoring of the impact-type anchoring means there is a gap between the end of the impact-type anchoring means and the surface of the masonry. By means of this gap, when securing an object to the surface of the masonry improved holding of the object to be fixed can be obtained, even in the case of a location having a void.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a device for installing an impact-type anchoring means in accordance with the present invention.

DESCRIPTION OF PREFERRED EMBODIMENTS

A device in accordance with the present invention is used for installing an impact-type anchoring means.

The impact-type anchoring means 1 includes a metal sleeve 2 with a bore 3 which tapers conically towards the forward end. In the rearward region, the bore has an internal screw thread 4. To form an expansion region, the sleeve 2 is provided with longitudinal slots 5 starting from its forward end and extending over part of its length. For anchoring the impact-type anchoring means 1 in a drilled hole 6 of the fixing site 7, an expansion body 8 is driven by means of an impact tool 9 into the tapering internal bore 3 of the sleeve 2.

For preventing the impact-type anchoring means 1 from sliding deeper when the expansion body 8 is driven in, a device 10 is screwed into the internal screw thread 4 of the sleeve 2. The device 10 has a stop flange 11 and a threaded portion 12 adjacent thereto. When placing the impact-type anchoring means 1 in position, the stop flange 11 sits on the outer surface of the fixing site 7, so that the end face of the impact-type anchoring means 1 is flush with the outer surface of the fixing site 7. The device 10 is provided with a through internal bore 13 through which the rod 14 of the impact tool 9 can be pushed in order to drive in the expansion body 8. After anchoring of the expansion anchoring means 1, the device 10 is unscrewed from the internal bore 3 of the sleeve 2. In order to be able to use a rotary tool for unscrewing, the stop flange 11 in the exemplary embodiment illustrated is formed with two opposed surfaces 15 for a wrench. After the device 10 has been unscrewed, the internal screw thread 4 of the sleeve 2 is available for fixing an object by means of a screw (not shown).

It will be understood that each of the elements described above, or two or more together, may also find a useful application in other types of constructions differing from the types described above.

While the invention has been illustrated and described as embodied in device for installing an impact-type anchoring means, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anchoring device for insertion within a bore formed in a fixing site, comprising:

an impact-type anchoring means having an expansion sleeve with an internal bore, said internal bore being tapered in a forward region and threaded in a rearward region;

means for installing said impact-type anchoring means in said bore of said fixing site, said means for installing including an impact tool having a shoulder portion and a rod extending from said shoulder portion;

a body part having a stop flange adapted to abut against said fixing site, said body part also having a threaded portion, said threaded portion threadably engaging said rearward region of said internal bore, said body part further comprising a through going internal bore extending in a longitudinal direction thereof, said through going internal bore being of sufficient diameter to allow said rod of said impact tool to pass therethrough;

an expansion body located in said forward region of said expansion sleeve, said expansion body being adapted to be driven into the tapered region of said expansion sleeve by said impact tool, so that said expansion sleeve is driven into said fixing site;

whereby, in use, the expansion sleeve is located within the bore of the fixing site, the expansion body is located within the forward region of the expansion sleeve, the body part is attached to the rearward region of the expansion sleeve and the stop flange is in abutting contact with the fixing site, the rod of the impact tool in inserted into the through going bore of the body part, and said shoulder portion of the impact tool is in abutting contact with an upper surface of the body part with the end of the rod being in abutting contact with the expansion body.

2. A device as defined in claim 1; and further comprising a rotary tool, said stop flange being provided with engaging means cooperating with said rotary tool for unscrewing said body part.

3. A device as defined in claim 2, wherein said engaging means is formed by two surfaces located opposite to one another at opposite sides of an axis of said stop flange.

4. A device as defined in claim 1, wherein said body part has a cylindrical collar provided between said stop flange and said threaded rearward portion and having a diameter adapted to correspond to a diameter of the sleeve.

\* \* \* \* \*